INVENTOR.
BJORNULF JOHNSEN

May 25, 1943.　　　　B. JOHNSEN　　　　2,319,867
FLUID DISPENSING DEVICE
Filed Aug. 11, 1938　　　4 Sheets-Sheet 3

INVENTOR.
BJORNULF JOHNSEN
BY
Auton and Griswold
ATTORNEYS.

May 25, 1943.                B. JOHNSEN                    2,319,867
                         FLUID DISPENSING DEVICE
                         Filed Aug. 11, 1938        4 Sheets-Sheet 4
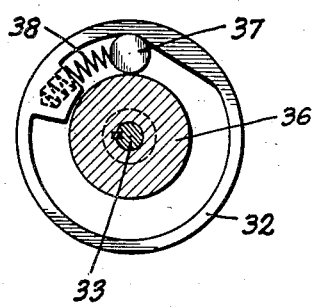
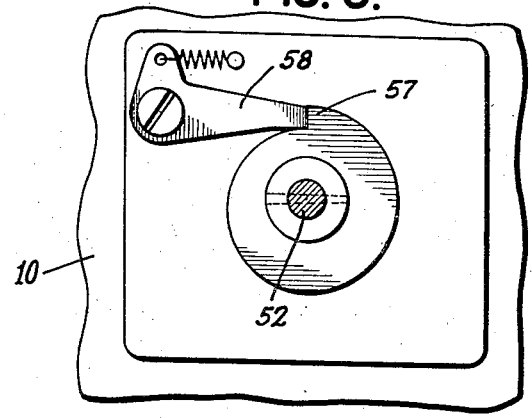
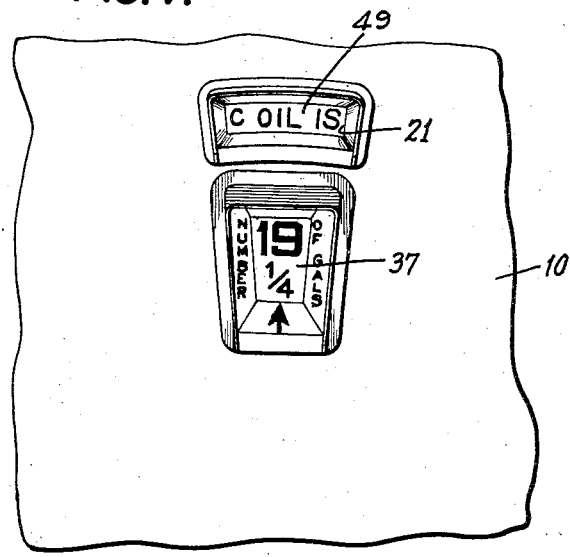
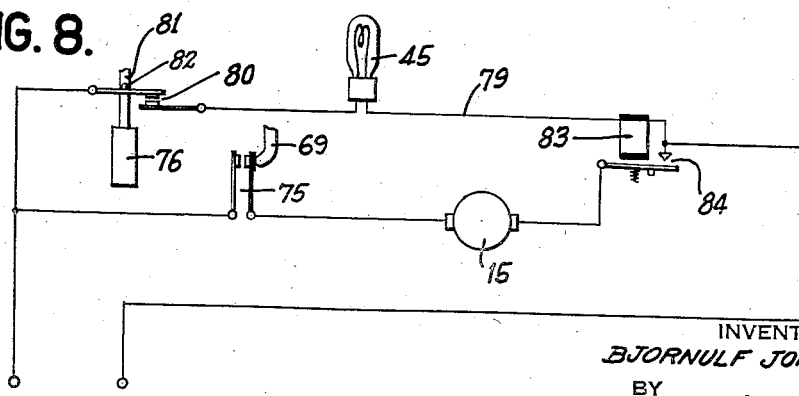
INVENTOR
BJORNULF JOHNSEN
BY
Orton and Griswold
ATTORNEYS Patented May 25, 1943

2,319,867

UNITED STATES PATENT OFFICE 2,319,867

FLUID DISPENSING DEVICE

Bjornulf Johnsen, Summit, N. J.

Application August 11, 1938, Serial No. 224,310

3 Claims. (Cl. 221—95)

This invention relates broadly to fluid dispensing devices such as are adapted to dispense gasoline and other liquid fuels at roadside service stations and the like, of the kind in which the elevation of fluid, as from a tank beneath the ground, is effected by means of a pump or other flow establishing means.

In fluid dispensing devices of this type heretofore known, the volume of fluid delivered from the nozzle has generally been indicated either by a pointer travelling over a graduated dial or by a graduated dial travelling past an index or fixed pointer. In either method of indication, the relative movement between the pointer and dial is effected from a fluid metering device, usually one which has a shaft rotating in proportion to the amount of fluid passing through the meter.

In such fluid dispensing devices the indicating means has usually been manually returned to zero.

Recent practice in fluid dispensing devices, which use the rotation of the shaft of the meter as a driving means for moving the indicator or dial to indicate the volume of fluid dispensed, has been to add various auxiliary devices for making the fluid dispensing device more reliable in action. Also there has been added computing devices, generally with price control, automatic return to zero often with an automatic motor control and various other devices all of which are driven from the meter shaft. These devices have placed such loads on the meter as to affect its accuracy.

One object of the present invention is to provide indicating mechanism for a fluid dispensing device in which the indicating means is moved to indicating position by the meter but so that the meter does not carry any appreciable load. Accordingly, the indicating mechanism is very small and light and the indication shown by the indicating mechanism is projected preferably so as to appear in an enlarged form on a screen on one or both sides of the dispensing device. While the enlarged image on the screen or screens shows the position of the indicating means at all times, the indicating means itself is so small and light in weight that the load on the meter does not affect its accuracy.

The invention also seeks a structure which is practical from the standpoint of manufacture and use and one which is universally applicable to dispensing apparatus having various other devices cooperating with or forming a part thereof.

These and other objects of the invention and the means for their attainment will be more apparent from the following detailed description, taken in connection with the accompanying drawings showing one embodiment by which the invention may be realized, and in which Figure 1 is a view, in side elevation, showing a fluid dispensing apparatus to which the invention is applied;

Figure 5 is a fragmentary view in horizontal section of the one-way drive between the meter and the indication carrier;

Figure 6 is a detail view taken on the line 6—6 of Figure 3 showing the zero stop;

Figure 7 shows a modification; and

Figure 8 is a diagram of one electrical circuit which may be employed to carry out this invention.

Figure 1:
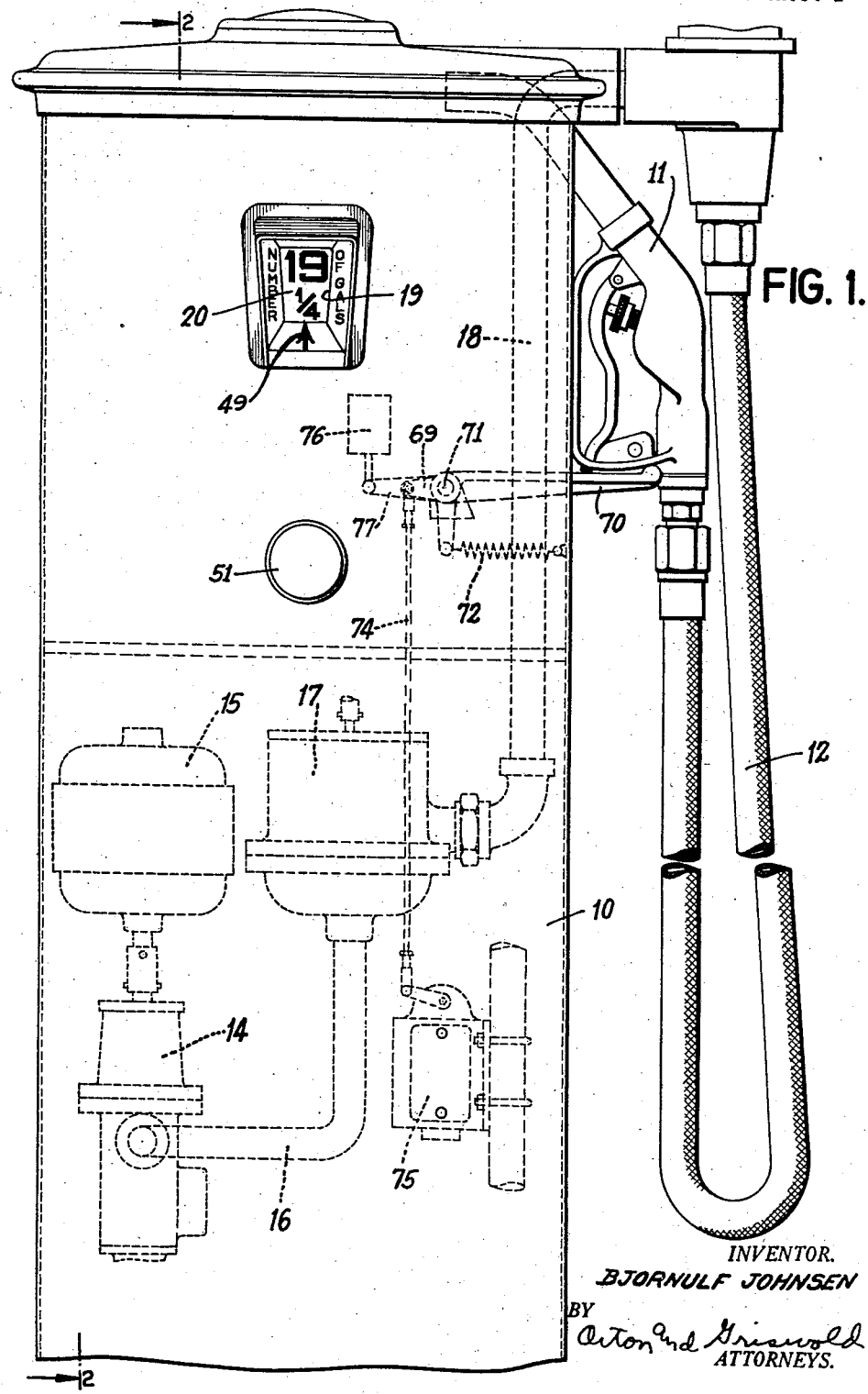

In the illustrated embodiment, a dispensing standard or housing 10 of any convenient shape is adapted to support and contain the devices for elevating liquid from a tank (not shown), say, beneath the ground and for measuring it on delivery from a nozzle 11 on the end of a hose 12 into, say, the fuel tank of an automobile. Liquid elevating means, such as a pump 14, driven by a motor 15 establishes the flow of the liquid through the pipe 16 to the meter 17 and from thence to the connection 18 for the hose 12. The pump 14, motor 15 and meter 17 are indicated in dotted lines in Figure 1. In the front of the housing 10 and at a desirable elevation where it may be easily visible, or if desired, in both the front and back, the housing 10 is formed with an opening 19 which is closed by a ground glass screen or window 20, Figure 3. It is upon the screen 20 that the position or motion of the means indicating the volume of the fluid delivered is projected by the devices to be hereinafter described.

Figure 2:
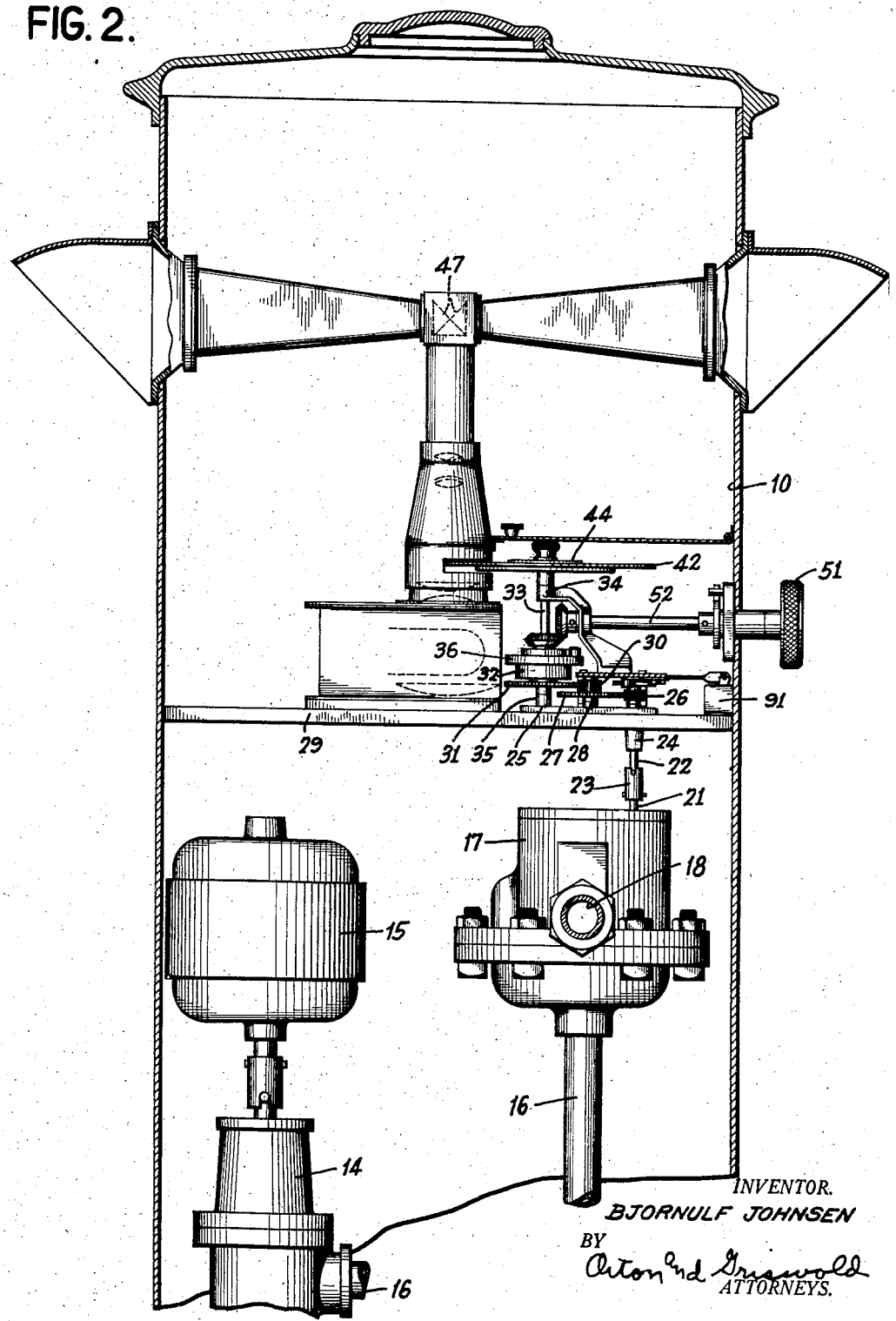
Figure 2 is a view in vertical section, taken on a plane indicated by the line 2—2 of Figure 1 and looking in the direction of arrows.

The meter 17 (Figure 2) has projecting therefrom the usual meter shaft 21 which revolves once, say, for each gallon passing through the meter 17. The meter shaft 21 is coupled to a shaft 22 by means of the sleeve 23. The shaft 22 extends upwardly through bearing 24 conveniently formed in a base or support 25. Fastened on the upper ends of shaft 22 is a pinion gear 26 which meshes with a spur gear 27 rotating freely on a stud 28 mounted in the support 25 and plate 29. Mounted with gear 27 and rotating therewith is a pinion 30. This pinion 30 meshes with a spur gear 31, which is mounted on a clutch disc 32 which is loose upon shaft 33. Shaft 33 is supported by an upper bearing 34 and a lower bearing 35 which forms part of the casting 25. The clutch disc 32, see Figures 3 and 5, forms one portion of a ball clutch comprising the driving disc 32, the driven disc 36 and disc 37, which is pressed into engagement by spring 38. This is a well known form of ball clutch. When clutch disc 32 is driven counter-clockwise, as viewed in Figure 5, it rotates disc 36 in the same direction. Disc 36 is keyed to shaft 33 and due to the ball clutch disc 36, the shaft 33 may be freely rotated in a clockwise direction, as will be understood.

Mounted at the upper end of shaft 33 is a disc 40 which serves for a support for the transparent plate 42 which carries the indices to be projected on the screens 20 at each side of the dispensing standard to indicate the volume of fluid delivered. This index disc need be only a few inches in diameter and in the illustrated embodiment has its surface divided circumferentially into the conventional twenty gallon divisions and into fractions of gallons. If desired, the disc 42 may also carry advertising media 49 visible through another window 21 in the casing 10, see Figure 7.

The projection system may be of the simplest character but must have certain mirrors placed so that the right hand side of the frame will show at the right on both sides of the dispensing standard or in other words that the projected images will be right side up and read in their proper order. This may be accomplished in the following manner:

The disc 42 is clamped between plate 40 and the removable plate 44 which is screwed on the top of shaft 33. Thus the disc 37 is readily removable and permits interchange of discs. Light from a source of light 45 having a reflector 46 is gathered up by the condensers 41 and is projected through the lens system 48 which may be of any usual form depending on the degree of definition desired.

A shield 43 cuts down the field of illumination to any desired size or shape.

Figure 3:
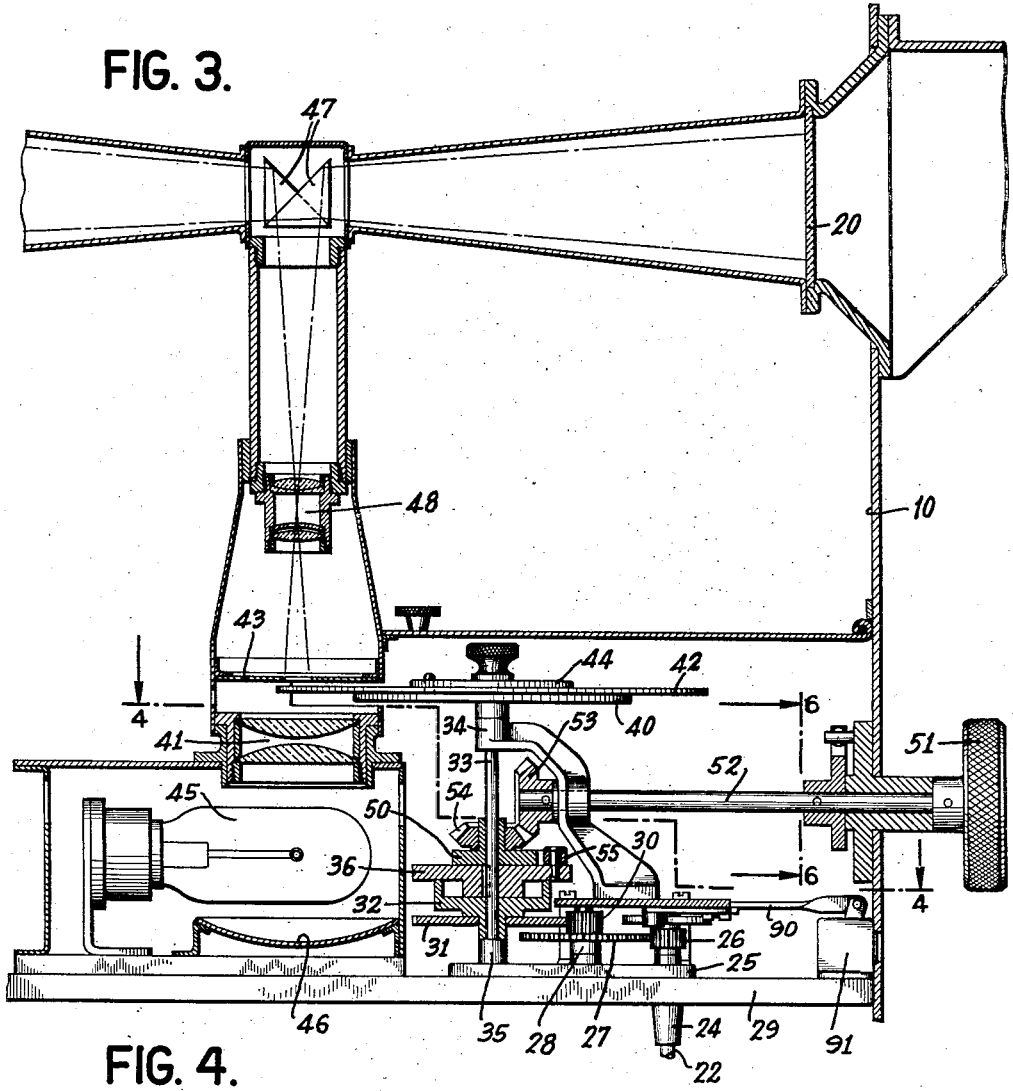
Figure 3 is an enlarged view, in section, of the projection device of Figure 2.
Figure 4:
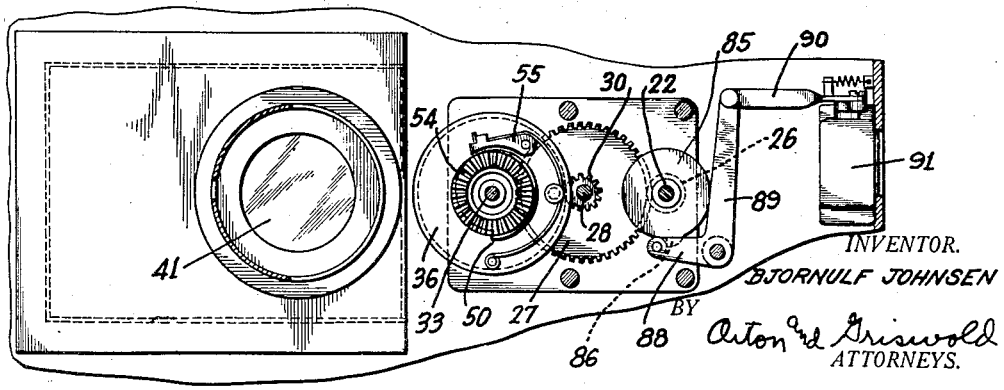
Figure 4 is a horizontal plan section taken on the broken lines 4—4 of Figure 3.

The direction of the light cone, after leaving the lens system 42 may then be changed, as at 47, see Figure 3. The light cone on the two mirrors or prisms 47 set at 90° to one another is sent as two light rays toward the screens mounted on the respective sides of the dispensing standard. Above disc 36 is a ratchet 50 (Figures 3 and 4). Spring pressed pawl 55 freely rotatable on shaft 33 on clutch member 36 cooperates with a single tooth of the ratchet to effect drive of the clutch member 36 in the opposite direction.

For returning the indicating device to zero, the knurled knob 51 is mounted on shaft 52 on the outside of the casing 10 (Figure 3). On the shaft 52 is mounted a bevel gear 53 which meshes with a bevel gear 54 integral with ratchet 50. The knob 51 is turned by the operator until the shoulder 57 is stopped by the pawl 58. This is a zero stop and the indicator is then at initial position. During this operation, the driving gear 31 remains stationary due to the action of the ball clutch 32, 36. The indicating device 42 is now at zero and ready for another operation.

If desired, the light 39 may be turned on automatically whenever the motor operates. Obviously also the device may be automatically returned to zero, in known manner.

The screens 20 are conveniently of ground glass or some similar material so that the image of the indicia on the transparent disc 42 may be viewed from the outside of the standard. The proportions of the optical system are so established that the images appearing on the screens are greatly enlarged from their original size on the revolving disc 42. It will be apparent by reference to Figure 3 that the images on the ground glass screen 20 will read properly, i. e., right side up, when viewed from the outside of the dispensing standard.

The images 37 of a portion of the disc 42 is projected by the source of light 45, condensers 41 and optical system 48 on to the prisms or 45° mirrors 47 and, of course, are now in a reversed position but when viewed from the outside of the standard, the figures will be right side up and not in reverse.

Also mounted on the shaft 22 is a disc 85 having a single tooth 86 adapted each time disc 85 rotates to engage a roller on one arm 88 of a bell crank lever 88—89. The other arm 89 of this bell crank is connected by link 90 to totalizing mechanism 91 of any desirable characteristic.

While various means of initiating the operation of the pump may be resorted to there is shown in the illustrated embodiment, referring to Figures 1 and 6, a disposition of parts where in the switch is automatically closed upon the removal of the nozzle from its support and at the same time the light source 45 is energized. Provision is also made, as shown in the wiring diagram of Figure 8, to interrupt the operation of the motor 15 should the circuit through the lamp 45 be interrupted as, for instance, if the lamp filament should fail. The nozzle 11 is carried upon the movable support 70, pivoted as at 71 and movable under the influence of the spring 72 about the pivot 71 so that the support 70 will turn in a counter-clockwise direction when the nozzle 11 is moved from the support. Attached to the arm 69 of the lever 70 is a link 74 actuating switch 75 controlling the circuit including the motor 15. This is diagrammatically illustrated also in Figure 8 where the arm 69 and nozzle support is represented as closing the switch 75 in the circuit of the motor 15. It will be apparent, therefore, that when the nozzle 11 is removed from its support, the arm 69 will move downwardly and close the switch 75 thus energizing the motor and commencing the operation of the pump 14. To govern the movement of the nozzle support 70, a dash pot 76 is provided also attached to an extension, say, 77, of the nozzle support 70. Thus counter-clockwise movement of the nozzle support is governed when the nozzle is removed from its support and this controlled movement is utilized to energize and complete the motor circuit and illuminate the lamp. The lamp 45 is included in the circuit 79, in parallel with the switch 75 and motor 15. In the circuit 79 are a pair of normally spaced contacts 80 but the dash pot arm 81 carries a pin 82 which, as the lever 70 moves, serves to close the contacts 80 and complete a circuit through the lamp and through an electro-magnet 83 of the relay 83—84. Energization of the electro-magnet 83 closes the contacts 84 and completes the circuit including the motor 15 so that the motor may operate. If the circuit 79 for any reason is broken as by a break in the filament of the lamp 45, the relay 83—84 is deenergized, the contacts 84 opened and the motor operation discontinued.

It follows that as the disc 42 is revolved by the meter as before described the moving image will appear on the screens on either side of the dispensing standard in a manner shown in Figure 1 where the stationary pointer 49 will indicate the amount of gasoline which has passed through the meter. The mechanism may now be reset to zero in the manner before described and the operation repeated.

By means of this method of displaying the quantity of fluid which has passed through the meter, the figures may be enlarged to any desired size making for ease of reading and ability of the purchaser to read the figures at some distance.

At the same time the transparent disc may be relatively small and of light material as the indicia thereon need be only very small because of the magnification to which they are subjected. Such disc, therefore, may be of very light construction placing practically no load on the meter and making for extreme accuracy in the operation and metering of the fluid dispensed. Because of the extent of possible magnification, the indication on the outside of the casing of the quantity of fluid dispensed is almost unlimited, thus affording maximum visibility to the purchaser.

While the invention has been illustrated as applied to a fluid dispensing apparatus where the motor switch is manually controlled, it will be apparent that the invention is equally applicable to a dispensing apparatus making use of an automatically started and stopped motor.

While the illustrated embodiment makes a showing that images of the same disc may be shown on opposite sides of the same standard, it will be apparent to those familiar with optics that the image of the disc 37 can be thrown on four or more sides of the standard at the same time.

Various modifications will occur to those skilled in the art in the configuration and disposition of the component elements going to make up the invention as a whole as well as in the selection and/or combination of particular elements to accomplish desired purposes and it will be obvious that the indicia which are projected may give readings of the volume or value or both of the fluid dispensed and no limitation is intended by the phraseology of the foregoing description or illustrations in the accompanying drawings except as indicated in the annexed claims.

What is claimed is:

1. In a fluid dispensing apparatus having a casing formed with a window and having a shaft rotated by a meter through which fluid is forced by a motor driven pump to a nozzle carried by a movable support in inoperative position, in combination, a light source, means carried by the meter rotated shaft and bearing indicia, said means and said indicia being of relatively different light transmitting properties, a screen operatively disposed with respect to the window and to receive the image of indicia on the transparent means formed by the light source, a motor circuit comprising a switch closed by the nozzle support when in operative position and a relay and a holding circuit in parallel with said motor circuit comprising the light source and the relay whereby should the light source become inoperative the holding circuit is interrupted and the relay deenergized to open the motor circuit and prevent delivery of fluid to the nozzle.

2. In a device of the character described, in combination, metering means, an indicator the movement of which is proportional to the movement of the metering means, a movable hose support, a circuit including a motor, a switch and a relay controlled by the support, a holding circuit comprising a lamp to render the indicator visible, a switch and the aforesaid relay, said last named switch being closed by the movement of the support, said relay being rendered inoperative upon failure of the lamp whereby the motor circuit is opened and thereby stop the motor whenever the indicator is not visible.

3. In a device of the character described having a casing formed with a window and having a shaft rotated by metering means and a support, in combination, a light source, means carried by the shaft and bearing indicia, said means and said indicia being of relatively different light transmitting properties, a screen operatively disposed with respect to the window and to receive the image of indicia on the transparent means formed by the light source, a motor circuit comprising a switch closed by the support when in one position and a relay and a holding circuit in parallel with the motor circuit comprising the light source and the relay whereby should the light source become inoperative the holding circuit is interrupted and the relay deenergized to open the motor circuit.

BJORNULF JOHNSEN.